DEVICE FOR REGULATING MULTIPLE CONCURRENT ELECTRICAL PULSES

Filed Oct. 12, 1962

INVENTOR

Albert M. Randolph

BY Adolph G. Hugin

ATTORNEY 3,189,695
Patented June 15, 1965

3,189,695

DEVICE FOR REGULATING MULTIPLE CONCURRENT ELECTRICAL PULSES

Albert M. Randolph, Shreveport, La., assignor to United Gas Corporation, a corporation of Delaware Filed Oct. 12, 1962, Ser. No. 230,147
7 Claims. (Cl. 200—11)

This invention relates to devices for regulating multiple concurrent electrical pulses and particularly adapted to regulate the duration of timing of a plurality of pulses occurring substantially simultaneously.

The increasing complexity of modern business and industry, particularly in the volume of units, readings, etc. that must be handled, has developed a need for a portable or semi-portable device, relatively small in size and simple to operate, which is capable of recording information for input into computers. The device may be used for any purpose in which the listing of numbers, preparation of tallies, lists, or the like is required. For example, the device might be used in stores for taking inventory, in railroads for freight car checking, and in meter reading operations for making a record of meter readings and the like.

An important aspect of these devices is the need for small light-weight and reliable components. It is especially necessary that such components assure an accurate entry or recordation for each item of information. A magnetic digital recorder for providing these desired results is disclosed in detail in a copending application of John R. Davis et al., Serial No. 165,717, filed January 4, 1962, entitled "Magnetic Digital Recorder," assigned to the assignee of the present application. Such magnetic recorders are adapted to make a record of the information in accordance with a predetermined code. Various of these codes have been developed and more or less standardized, so that the recordation of the information may be placed upon a suitable magnetic tape and subsequently processed through a computer with or without the assistance of an interpreter or converter which makes the codified information available for use by the computer.

In general, the record on the magnetic tape is made by a plurality track magnetic recording head which is adapted magnetically to record in any selected number of tracks according to the required codified representation for the information being recorded. As a result of this type of code operation, the plural track recording head often is required to impress a magnetic force on the tape on more than one track. These tracks normally extend longitudinally of the tape and preferably are parallel to each other and to the edges of the tape. In most modern recorders provision is made for adjustment of the recording head so as to prevent skew of the head with reference to the edges of the magnetic tape in order to obtain substantial transverse alignment of pulses in the different tracks when these pulses represent a single digit in the recordation.

In the magnetic recorder disclosed in the above copending application and similar recorders, various digit switches conventionally are set by the operator to indicate the information which is to be recorded by the magnetic recording head on the magnetic tape. A commutator usually also is provided which sequentially commutates the various digit switches so as to energize the recording head sequentially in accordance with the setting of the respective digit switches. The commutator may comprise wafer switches which include a plurality of wafers each having a plurality of circumferentially spaced stationary contacts and a wiping contactor adapted to close respective circuits with the stationary contacts. Corresponding stationary contacts and the wiper contactor of each wafer are respectively mounted in substantial axial alignment, so that operation of the wafer switches produces an engagement by a wiper contactor of each wafer with a stationary contact thereof which is aligned with corresponding contacts on the other wafers.

With such an arrangement the electric pulses produced by the closing of the circuit through the contacts of each wafer occur substantially simultaneously and therefore energize the multiple-track recording head in a manner which will impress a magnetic recordation substantially simultaneously in each track transversely of the magnetic tape. The accuracy of the recordation of the pulses in the different tracks of the magnetic tape depends on the accuracy of the making and breaking of the electrical circuits by the different wiper contactors with the respective stationary contacts of the wafer switches. Normal manufacturing tolerances do not provide for the exact uniform spacing between stationary contacts on such wafer switches and also do not assure the uniform duration of contact between the wiper contactor and all of the stationary contacts. Thus, it is not possible to obtain an accurate and uniform duration of the recorded pulses on the magnetic tape or to obtain a uniform starting and stopping of the pulses recorded on the magnetic tape due to the slight manufacturing inaccuracies in the angular spacing of the stationary contacts. Some computers do not require as much accuracy as others in the coded information which is supplied thereto, and electronic correcting means can be built into interpreter units used with the computers when required. Such correcting means usually would be more expensive than the provision of accurately recorded coded information on the magnetic tape.

In accordance with the present invention, a multiple-pulse regulating device is provided which is operable for concurrently initiating and concurrently ending electric pulses in all circuits which are made and broken by a plurality of multiple circuit making and breaking means, such as the wafer switches of a commutator in a magnetic recorder utilizing a multiple-track recording head. This multiple-pulse regulating device is adapted to regulate the duration of the pulses so as to provide for a uniform duration of all pulses in all tracks for all digits of a code.

An object of the present invention is to provide an improved multiple-pulse regulating device.

Another object of the present invention is to provide a multiple-pulse regulating device which is adapted to adjust uniformly the duration of all of the pulses.

A further object of the present invention is to provide an improved multiple-pulse regulating device which is adapted to provide for adjusting the timing of the occurrence of electrical pulses.

Further objects and advantages of this invention will become apparent from the following description referring to the accompanying drawings, and the feaatures of novelty which characterize this invention will be pointed out with particularity in the claims appended to and forming a part of this specification.

Figures 1, 2, 3, 4, 5, 6, 7:
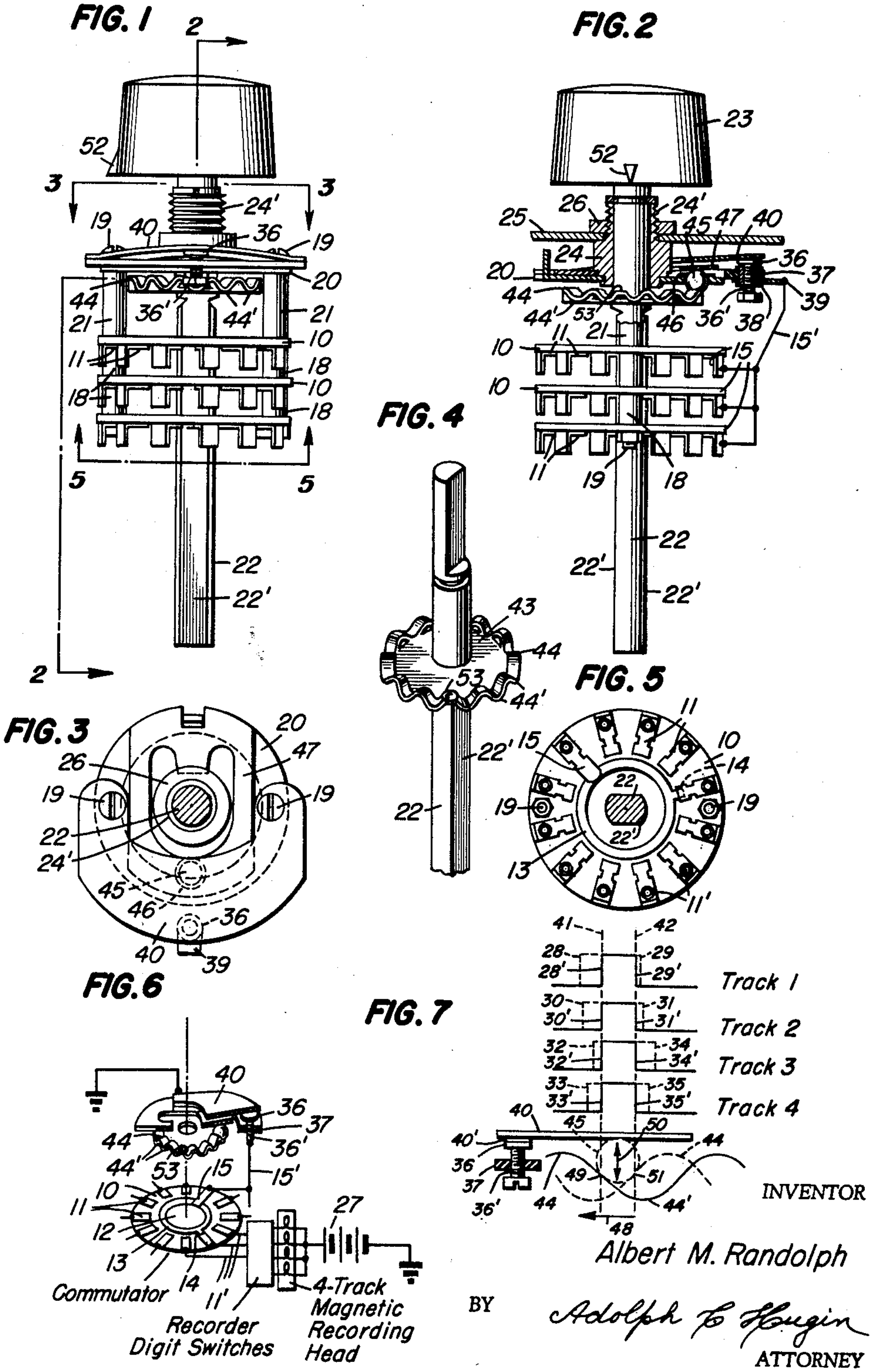
FIG. 1 is a side elevational view of a multiple-pulse regulating switch embodying the present invention, which is particularly useful as a multiple-pulse regulating device for providing for the concurrent initiation and concurrent ending of multiple pulses occurring substantially simultaneously and for adjustably regulating the duration of such pulses.
FIG. 2 is a side elevational view of the regulating switch shown in FIG. 1, partly in section, taken along line 2—2 of FIG. 1.
FIG. 3 is a sectional view of the pulse regulating device taken along line 3—3 of FIG. 1.
FIG. 4 is a perspective view of the commutator shaft and of the detent biasing disc mounted thereon used in the switch shown in FIGS. 1–3.
FIG. 5 is a sectional view, taken along line 5—5 of FIG. 1, illustrating an embodiment of a multiple-contact wafer switch which may be conveniently used in the illustrated embodiment of the present invention.

FIG. 6 is a schematic diagram illustrating the connection of a multiple-pulse regulating device, as shown in FIGS. 1–3, in a magnetic digital recorder provided with a four-track magnetic recording head; and FIG. 7 diagrammatically illustrates the manner in which the multiple-pulse regulating device shown in the other figures regulates the concurrent initiation and concurrent ending of multiple pulses occurring substantially simultaneously and also regulates the duration of such pulses in accordance with the present invention.

Referring to the drawings, an embodiment of the present invention is illustrated applied to three wafer switches adapted to be used as a commutator in a magnetic digital recorder, such as that disclosed in the above-mentioned copending application. The wafer switches which form part of the commutator comprise three circular wafer insulating contact supporting members 10 to which a plurality of circumferentially spaced stationary contacts 11 are secured in any suitable manner, as by rivets 11′. A central wafer insulating disc 12, on which a slip ring 13 is mounted, is arranged within each of the circular insulating members 10. A wiper contactor 14 is connected to the slip ring 13 in any suitable manner, as by being formed integrally therewith, and is of a size to provide for making an electrical contact with each of the stationary contacts 11 and for breaking the electrical contact with one of the contacts 11 before making contact with an adjacent contact. FIG. 5 illustrates details of this construction. One of the stationary contacts 15 is made longer than the other stationary contacts 11 and provides an electrical wiping engagement with the slip ring 13, so that a circuit can be formed from the stationary contact 15 to any one of the stationary contacts 11 through the slip ring 13 and the wiper contactor 14.

In order to commutate the coded information which is represented by the setting of a plurality of digit switches 16 in a recorder, FIG. 6, in a manner so that the settings of these digit switches can be sequentially entered on magnetic tape by a suitable magnetic recording head 17, the commutator is provided with a plurality of wafer switches as required for reading and entering the setting of all of the digit switches 16 into the magnetic recording head 17 by connecting the commutator stationary contacts 11 by conductors 11′ to the digit switches 16. In the illustrated example, the commutator comprises the three wafer switch contact supporting insulating members 10 and the associated respective contacts and contactors. These three supporting members 10 are axially spaced by insulating spacer elements 18 secured together by a suitable bolt 19. This bolt 19 also secures the wafer supporting members 10 to a main mounting plate 20 from which the uppermost supporting member 10 is spaced by insulating spacer elements 21. The supporting members 10 of the wafer switches are mounted relatively to each other so that the stationary contacts 11 and 15 are arranged in sets comprising one contact of each wafer switch in axial alignment with a corresponding contact of each of the other wafer switches. The wiper contactors 14 of the three wafer switches also are supported in axial alignment by the insulating discs 12, and these discs are secured in position relative to each other by being rigidly mounted on a commutator shaft 22 formed with flat sides 22′ adapted to engage corresponding flat sides of central openings in the discs 12. The discs are secured in position on the shaft 22 in any suitable manner, as by staking the shaft on each side of the discs. This construction provides a plurality of spaced multiple-contact wafer switches, each having a wiper contactor 14 insulated from and drivingly mounted substantially in axial alignment on the commutator shaft 22 and operable thereby to engage separately each stationary contact 11 of its respective multiple-contact wafer switch.

As is best shown in FIG. 6, the commutator reads the settings of the recorder digit switches by the sequential engagement of the movable contactors 14 of the water switches with the succession of stationary wafer switch contacts 11. This sequential closing of electric circuits by the movable wiping contactors 14 through the stationary contacts 11 is obtained by rotating the commutator shaft 22 which supports the wiper contactor insulating disc 12. Such actuation of the shaft 22 may conveniently be obtained in a manually operable commutator, such as that shown in FIGS. 1, 2, and 6, by providing a suitable operating knob 23 on the shaft 22 and arranging this knob in a conveniently accessible position with reference to the recorder structure. In the illustrated construction, the shaft 22 is adapted to be rotatably supported by a bearing 24 having a threaded end 24′ which may be used to secure the bearing in the cover 25 of a recorder casing by a suitable nut 26, thereby providing for the support of the commutator and its operating knob 23 on the recorder casing.

In a recorder such as that schematically illustrated in FIG. 6, the recordation of information on magnetic tape is adapted to be made by a four-track magnetic recording head 17, which is energized by any suitable source, such as a battery 27, when the circuit for the coils of the different tracks of the recording head are closed through the recorder digit switches and the commutator. Energization of the coils of the magnetic recording head 17 in a return-to-zero type magnetic digital recorder is in the form of electrical pulses which have a duration corresponding to the time during which the electrical circuit is closed for energizing these coils. In a system utilizing wafer switches, similar to that illustrated in FIG. 5, for the digit switches and also wafer switches of this type in the commutator as shown in FIGS. 1, 2, and 6, the duration of the electrical pulse energizing the recording head coils may vary slightly, depending upon the slight variations in the configuration of the contacting portion of the stationary contacts 11, and the pulse initiation and pulse ending also will vary due to variations in the angular spacing between the stationary contacts 11. These variations may be relatively slight, but will occur as normal manufacturing inaccuracies.

The variations in the pulses which energize the four coils of a four-track magnetic recording head 17 produce corresponding pulse variations or variations in the magnetic bits in a magnetic tape as is diagrammatically illustrated in FIG. 7. As there shown, the initiation of a magnetic bit in track 1 is shown by the dotted line 28 and its ending by the dotted line 29. The pulse duration is represented by the line extending between the ends of lines 28 and 29. This is the pulse or magnetic bit which would be recorded on a magnetic tape by completing the energizing circuit of the recording head for track 1 through the recorder digit switches and the commutator wafer switches. Similarly, the recorded pulse or magnetic bit in the tape in track 2 would be initiated as indicated by the dotted line 30 and end as indicated by the dotted line 31. In like manner, the pulse or magnetic bits in tracks 3 and 4 would be initiated as indicated by lines 32 and 33 and end as indicated by lines 34 and 35. The non-alignment of the lines 28, 30, 32, and 33 and of lines 29, 31, 34, and 35 clearly shows the variations in the initiation and ending of the pulses or magnetic bits which would be recorded on a magnetic tape by the use of conventional wafer switches as the commutator switches for such a recorder. The illustrated variations would also not be uniform for successive pulses or bits in each track as the variations in successive stationary contacts 11 of the wafer switches would seldom be uniform, such that the spacing between successive bits in each track also would be irregular.

For most computers, such a recordation would affect the accuracy of the results obtained by the use of the recorded information, and it would be desirable to eliminate the variations in the length or duration of the pulses, as well as the variations in the initiation and ending of the pulses, so that pulses of uniform spacing would be obtained in all four tracks of the multiple-track tape, and in addition the initiation and ending of pulses in the different tracks would be transversely aligned on the tape for each recorded digit. In accordance with the present invention, provision is made for closing the recording head energized circuit only after all of the commutator contactors 14 have completed engagement with stationary contacts 11 and for breaking this electrical circuit before any of the contactors 14 have become disengaged from respective stationary contacts. The action of this type of commutator structure is to provide electrical energizing pulses concurrently to all of the tracks to be energized in the recording head and concurrently to break the energizing circuit in all of these tracks.

In the illustrated construction, the regulation of the multiple pulses energizing the multiple-track recording head 17 is obtained by connecting the contactors 14 of all of the commutator wafer switches through their respective slip rings 13 and stationary contacts 15 by a common line 15′ to a regulating contact 36 which is conveniently adjustably mounted on an insulating support 37. The adjustable mounting of the contact 36 preferably is formed by a threaded shank 36′ of the contact 36 which threadedly engages an electrically conductive bushing 38 secured in an aperture in the insulating support 37. As shown in FIG. 2, the electrical connection of the contact 36 to the stationary contacts 15 of the wafer switches preferably is made through a terminal 39 which may conveniently be secured to the contact 36 by the bushing 38 in any suitable manner. Provision for completing the electrical circuit through the contact 36 is made by arranging a leaf spring element 40, secured to the main mounting plate 20 by the bolts 19, such that it extends over and normally is pressed downwardly into engagement with the contact 36. In this manner the electrical circuit is completed by being grounded through the contact 36, the leaf spring element 40, and the mounting bolts 19 whenever the commutator contactors 14 engage a stationary commutator wafer switch contact 11.

This grounding engagement of the contact 36 with the spring leaf element 40 is diagrammatically illustrated in FIG. 7. If desired, a contact 40′, FIG. 7, may be mounted on the spring 40 for engagement with the contact 36. In order to provide for concurrently initiating and concurrently ending a plurality of pulses which occur substantially simultaneously, it is essential that the completion of the circuit through the contact 36 and the spring element 40 occur subsequent to the engagement of each of the contactors 14 with a stationary contact 11; that is, the circuit must be completed subsequent to the time which is indicated by the dotted lines 28, 30, 32, and 33 in FIG. 7. Such a time may be chosen as the time which is represented by the dotted line 41. In a system having a four-track magnetic recording head such as that shown in FIG. 6, the initiation of the pulses in tracks 1, 2, 3, and 4, FIG. 7, is indicated by the lines 28′, 30′, 32′, and 33′. Similarly, the ending of a pulse will occur when the circuit is interrupted by the disengagement of the leaf spring element 40 with the contact 36 so as concurrently to end all of the pulses in the four tracks. It is also necessary that this ending of the pulses in the four tracks occur prior to the disengagement of any of the contactors 14 with any of the respective wafer stationary contacts 11. Such a concurrent ending of the multiple pulses may be chosen at any time subsequent to the initiation of the pulses and is indicated in the diagram of FIG. 7 by the dotted line 42. This will provide for the ending of the pulses as indicated by the lines 29′, 31′, 34′, and 35′, all of which occur prior to the breaking of the contact by disengagement of the contactors 14 with the stationary contacts 11 indicated diagrammatically in FIG. 7 in the four tracks by the dotted lines 29, 31, 34, and 35.

In order to obtain this desired operation of the multiple-pulse regulating switch, an operating mechanism is provided which is operable simultaneously with the operation of the wafer switch contactors 14 and is arranged to provide for the engagement and disengagement of the leaf spring element 40 with the contact 36 respectively after the engagement of each of the contactors 14 with a respective stationary contact 11 and prior to the disengagement of all of the contactors 14 with respective wafer stationary contacts 11. This operating mechanism includes an operating cam plate or disc member 43 which is fixedly mounted on the commutator shaft 22 in any suitable manner for rotation therewith. The operating disc member 43 is formed with a plurality of peripherally disposed camming undulations 44 which may conveniently simply be pressed along the outer edge of the disc. The number of undulations 44 in the operating disc 43 correspond in number to the number of stationary contacts 11 on each of the wafer switches, and one of the valleys 44′ of the undulations 44 is arranged in axial alignment with the contactors 14 of the wafer switches. A detent ball 45 is movably mounted in a guide 46 which may be formed as a cylindrical aperture or passageway through the mounting plate 20 and a boss pressed through the mounting plate, as is shown in detail in FIG. 2. A biasing detent leaf spring 47 is fixedly secured in any suitable manner to the mounting plate 20 with a free end thereof in engagement with the side of the detent ball 45 away from the undulated disc member 43. The guide 46 is arranged radially of the mounting plate 20 so as to provide for seating and movably retaining the detent ball 45 substantially directly over the cam undulations 44 in the disc 43, and the leaf spring 47 resiliently biases the ball 45 through the guide 46 into engagement with the adjacent surfaces of the undulations 44. With such an arrangement the pressure of the spring 47 on the ball 45 exerts a force on the surface of the undulations 44 engaged by the ball 45 which tends to move the disc member 43 so as to cause the ball 45 to rest in an undulation valley 44′ and resiliently biases the wiper contactors 14 into engagement with stationary contacts 11 of the wafer switches. It also resiliently opposes disengagement of the contactors 14 from the contacts 11.

Operation of the multiple-pulse regulating device is readily obtained simply by turning the operating knob 23, which rotates the commutator shaft 22 and causes each of the wafer switch contactors 14 sequentially to engage the respective stationary contacts 11 of each of the wafer switches. Since one of the undulation valleys 44′ is in axial alignment with the wafer switch contactors 14, and since there are the same number of undulations 44 on the disc member 43 as the number of stationary contacts 11 on each wafer switch, turning of the knob 23 causes the detent ball 45 to ride over the undulations 44, and provides for operation of the electric pulse regulating device in accordance with the operation of the wafer switch wiper contactors 14. As the detent ball 45 rides over an undulation 44, it moves upwardly, as indicated by the arrow 50, FIG. 7, and causes the spring 47 to be biased upwardly into engagement with the spring element 40 to such an extent that the spring element 40 will become disengaged from the contact 36. This opens the energizing circuit of the system, such as that shown in FIG. 6, and maintains this circuit open until the undulations 44 have moved in the direction of the arrow 48 to a position wherein the ball 45 will have moved downwardly over the surface of the undulation 44 to a point 49, FIG. 7, at which time the spring element 40 again will engage the contact 36 and close the energizing circuit of the system. This closure of the energizing circuit of the system is indicated by the dotted line 41 and is chosen so as to occur after the several wafer switch contactors 14 have engaged respective stationary contacts 11 on the wafer switches. This will provide for the concurrent initiation of pulses in all of the tracks of the magnetic recording head which are adapted to be energized in accordance with the coded information indicated by digit switches 16 of the recorder.

The occurrence of the initiation of the pulses can be regulated simply by turning the threaded shank 36′ which supports the contact 36 in its mounting in the insulating support 37 so as to move the contact 36 nearer to or farther from the leaf spring element 40, so that it will be engaged sooner or later respectively as the ball 45 moves downwardly over the surface of an undulation 44 toward an undulation valley 44′. The circuit of the system will remain energized through the contact 36 and the spring element 40 during the time that the undulation 44 moves, as indicated by the arrow 48, with the detent ball 45 moving downwardly into a valley 44′ and until it has moved upwardly on the next undulation 44 to a point 51. When the ball 45 reaches the point 51 on an undulation 44, it will again have raised the spring 47 into engagement with the spring element 40, and further movement of the undulations 44 will cause the ball 45 to ride further up on the undulation 44, which will result in the spring 47 lifting the spring element 40 out of engagement with the contact 36, whereby the energizing circuit of the system is broken. This is indicated by the dotted line 42 in FIG. 7 and produces a concurrent ending of all of the pulses in the four tracks, as indicated by the lines 29′, 31′, 34′, and 35′, all of which occur prior to the disengagement of the contactors 14 with respective stationary contacts 11 of the wafer switches. This provides for a very uniform duration of all of the pulses and for the concurrent initiation and concurrent ending of all pulses adapted to occur substantially simultaneously transversely of a recording track when this type of pulse regulating device is used in a magnetic recorder.

In order to assure the proper recordation of information or otherwise to indicate the completion of a commutating cycle, it is desirable to provide an arrangement which will alert an operator of the occurrence of this condition. This may be provided in any suitable manner, as simply by the addition of a suitable indicia line on the casing cover 25 with an indicator 52, such as an arrowhead, on the operating knob 23. Thus, when the indicator 52 is turned into correspondence with the indicia line on the cover 25, the operator will know that a cycle has been completed.

In some instances it may be desirable to provide a more positive indication of the completion of a cycle by releasably latching the operating knob 23 when a cycle has been completed. Such a releasable latch may conveniently be incorporated in the illustrated embodiment of the invention simply by depressing the top of an undulation 44 so as to form a recess 53 in the undulation which will be engaged by the detent ball 45 at the time that all of the wafer switch contactors 14 have completed an operating cycle and are out of engagement with the stationary contacts 11 of the respective wafer switches so that the system is completely deenergized. This will provide the operator with the feel that the operating knob 23 is latched and thereby will alert the operator to the fact that the operating cycle has been completed. In some instances it may be desirable to use both the releasable latching arrangement provided by the detent ball 45 and the undulation recess 53 with the cover indicia and indicator 52. This type of multiple-pulse regulating device will assure a uniform duration of sequential pulses with a concurrent initiation and a concurrent ending of all pulses occurring substantially simultaneously in multiple circuits of the system and provide for a ready indication of the completion of an operating cycle.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A device for regulating multiple electric pulses comprising an operating shaft, means for rotatably supporting said shaft, a plurality of spaced multiple-contact wafer switches spaced axially of said shaft and each having an insulating support with a plurality of circumferentially spaced contacts thereon, corresponding contacts of all wafer switches being arranged in substantially axially aligned sets, each wafer switch also having a wiper contactor insulated from and drivingly mounted on said shaft substantially in axial alignment with the other of said wiper contactors and arranged to be operable to engage separately each contact of its respective multiple-contact wafer switch, means for resiliently biasing said wiper contactors into engagement with a contact on respectively associated wafers and resiliently opposing disengagement therewith, electric pulse regulating means mounted for operation by said wiper contactor resilient biasing means in accordance with operation of said wiper contactors and electrically connected in series with all of said wiper contactors and operable for providing a closed circuit through said regulating means subsequent to the making of contact by all of said wiper contactors with any one set of aligned contacts on associated wafers and for opening such circuit prior to the breaking of contact by any of said wiper contactors with any contact of such aligned set of contacts providing for simultaneously energizing and simultaneously deenergizing circuits through all said wiper contactors, and means for adjusting the duration of said closed circuit of said regulating means.

2. A device for regulating multiple concurrent electrical pulses comprising an operating shaft, means for rotatably supporting said shaft, a plurality of spaced multiple-contact wafer switches, means for fixedly mounting said wafer switches on said shaft supporting means with all corresponding contacts of different wafer switches substantially in axially aligned sets, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged substantially aligned contacts of the respective wafer switches, means for resiliently biasing said wiper contactors selectively into engagement with contacts on respectively associated wafer switches and resiliently opposing disengagement therewith, means for separately providing an electrical connection to each wiper contactor for all positions thereof, electric pulse regulating means electrically connected to said wiper contactors and mounted for operation by said wiper contactor resilient biasing means in accordance with operation of said wiper contactors and operable for providing a closed circuit through said regulating means subsequent to the making of contact by all of said wiper contactors with any one set of aligned contacts on associated wafer switches and for opening such circuit prior to the breaking of contact by any of said wiper contactors with any contact of such aligned set of contacts, and means for concurrently oppositely adjusting the closing and the opening of said circuit through said electric pulse regulating means whereby the duration of such electric pulse can be varied.

3. A device for regulating multiple concurrent electrical pulses comprising an operating shaft, means for rotatably supporting said shaft, a plurality of spaced multiple-contact wafers, means for fixedly mounting said wafer switches on said shaft supporting means with corresponding contacts of different wafers substantially in axially aligned sets, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged substantially aligned contacts of the respective wafer switches, means for resiliently biasing said wiper contactors selectively into engagement with contacts on respectively associated wafers and resiliently opposing disengagement therewith, means for separately providing an electrical connection to each wiper contactor for all positions thereof, and electric pulse regulating means electrically connected in series with all of said wiper contactors and mounted for operation by said wiper contactor resilient biasing means in accordance with operation of said wiper contactors and operable for providing a closed circuit through said regulating means subsequent to the making of contact by all of said wiper contactors with any one set of aligned contacts on associated wafers and for opening such circuit prior to the breaking of contact by any of said wiper contactors with any contact of such aligned set of contacts providing for simultaneously initiating and simultaneously ending electric pulses in circiuts closed and opened through said wiper contactors.

4. A device for regulating multiple electrical pulses comprising an operating shaft, means for rotatably supporting said shaft, a plurality of spaced multiple-contact wafer switches each having a wiper contactor drivingly mounted substantially in axial alignment on said shaft to engage separately each contact of its respective multiple-contact wafer switch, means including a detent for resiliently biasing said wiper contactors selectively into engagement with contacts on respectively associated wafer switches and resiliently opposing disengagement therewith, electric pulse regulating means electrically connected in series with all of said wiper contactors and operable by said wiper contactor resilient biasing means in accordance with operation of said wiper contactors for providing a closed circuit through said regulating means subsequent to the making of contact by all of said wiper contactors with any one set of aligned contacts on associated wafer switches and for opening such circuit prior to the breaking of contact by any of said wiper contactors with any contact of such aligned set of contacts, said pulse regulating means comprising a fixedly mounted insulating support, a contact mounted on said support and adapted to be electrically connected to said wiper contactors, a fixedly mounted electrically conductive flexible leaf spring extending over said latter contact and having a contact adapted to be resiliently biased toward said insulating support mounted contact, said leaf spring extending over a part of said detent and being engageable thereby on actuation of said wiper contactors by said shaft for closing and opening said latter two contacts, and means comprising an adjustable mounting for said insulating support mounted contact for adjusting the duration of said closed circuit through said wiper contactors.

5. A device for regulating multiple electrical pulses comprising an operating shaft, means for rotatably supporting said shaft, a plurality of spaced multiple-contact wafer switches, means for fixedly mounting said wafer switches on said shaft supporting means with corresponding contacts of different wafers substantially in axially aligned sets, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged contacts of the respective wafer switches, means for separately providing an electrical connection to each wiper contactor for all positions thereof, means including a detent for resiliently biasing said wiper contactors into engagement with contacts on respectively associated wafer switches and resiliently opposing disengagement therewith, said detent comprising a cam plate mounted on said shaft for rotation therewith, said cam plate being formed with peripherally disposed undulations having valleys arranged substantially axially aligned one with each aligned set of contacts of said wafer switches, a detent ball, a fixedly mounted plate having a guide for seating and movably retaining said ball therein over said cam undulations, means including a fixedly mounted detent leaf spring arranged in engagement with said ball on the side thereof away from said cam plate for resiliently biasing said ball into engagement with said cam undulations whereby said detent means action is produced, and electric pulse regulating means electrically connected in series with all of said wiper contactors and operable by said wiper contactor resilient biasing means in accordance with operation of said wiper contactors for providing a closed circuit through said regulating means subsequent to the making of contact by all of said wiper contactors with any one set of aligned contacts on associated wafer switches and for opening such circuit prior to the breaking of contact by any of said wiper contactors with any contact of such aligned set of contacts.

6. A device for regulating multiple concurrent electrical pulses comprising an operating shaft, means for rotatably supporting said shaft, a plurality of spaced multiple-contact wafer switches, means for fixedly mounting said wafer switches on said shaft supporting means with corresponding contacts of different wafer switches substantially in axial aligned sets, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged contacts of the respective wafer switches, means for separately providing an electrical connection to each wiper contactor for all positions thereof, means including a detent for resiliently biasing said wiper contactors into engagement with contacts on respectively associated wafer switches and resiliently opposing disengagement therewith whereby said wiper contactors are yieldingly stopped and held in engagement with said contacts, electric pulse regulating means electrically connected in series with all of said wiper contactors and operable by said wiper contactor resilient biasing means in accordance with operation of said wiper contactors for providing a closed circuit through said regulating means subsequent to the making of contact by all of said wiper contactors with any one set of aligned contacts on associated wafer switches and for opening such circuit prior to the breaking of contact by any of said wiper contactors with any contact of such aligned set of wafer contacts, said pulse regulating means comprising a fixedly mounted insulating support, a contact mounted on said support and adapted to be electrically connected to said wiper contactor connection means, a fixedly mounted electrically conductive flexible leaf spring extending over said support mounted contact and having a contact adapted to be resiliently biased toward said support mounted contact, said latter leaf spring extending over part of said detent and being engageable thereby for closing and opening said latter two contacts, and means comprising an adjustable mounting for said support mounted contact adapted to move said latter contact axially relative to said detent for concurrently oppositely adjusting the closing and the opening of said two electric pulse regulating means contacts whereby the duration of said closed circuit of said regulating means can be varied.

7. A device for regulating multiple concurrent electrical pulses comprising an operating shaft, means for rotatably supporting said shaft, a plurality of spaced multiple-contact wafer switches, means for fixedly mounting said wafer switches on said shaft supporting means with corresponding contacts of different wafers substantially in axially aligned sets, a wiper contactor associated with each wafer switch and insulated from and drivingly mounted on said shaft operable thereby to engage separately each contact of its respective multiple-contact wafer switch, all wiper contactors being arranged substantially in axial alignment whereby to make and break contact substantially simultaneously with correspondingly arranged contacts of the respective wafer switches, means for separately providing an electrical connection to each wiper contactor for all positons thereof, means including a detent for resiliently biasing said wiper contactors into engagement with contacts on respectively associated wafer switches and resiliently opposing disengagement therewith, said detent comprising a cam plate mounted on said shaft for rotation therewith, said cam plate being formed with peripherally disposed undulations corresponding to the number of stationary contacts on each of said wafer switches, a detent ball, a fixedly mounted detent ball locating plate having an aperture for seating and movably retaining said ball therein over said cam undulations, means including a fixedly mounted detent leaf spring arranged in engagement with said ball on the side thereof away from said cam plate for resiliently biasing said ball into engagement with said cam undulations whereby said detent means action is produced, electric pulse regulating means comprising a pair of contacts mounted for operation by said wiper contactor resilient biasing means in accordance with operation of said wiper contactors for closing said pair of contacts subsequent to the making of contact by all of said wiper contactors with any one set of aligned contacts on associated wafers and for opening said pair of contacts prior to the breaking of contact by any of said wiper contactors with any contact of such aligned set of wafer contacts, said pulse regulating means including a fixedly mounted insulating support, one of said pair of contacts being mounted on said support and adapted to be electrically connected to said wiper contactor connection means, a fixedly mounted electrically conductive flexible leaf spring extending over said support mounted contact and carrying the other of said pair of contacts adapted to be resiliently biased toward said support mounted contact, said latter leaf spring extending over part of said detent spring and being engageable thereby for closing and opening said pair of contacts by movement of said detent ball respectively toward and away from said cam undulations on actuation of said cam plate, and means comprising an adjustable mounting for said support mounted contact of said pair of contacts adapted to move said latter contact axially relative to said cam plate for concurrently oppositely adjusting the closing and opening of said electric pulse regulating means pair of contacts whereby the duration of said closed condition of said pair of contacts can be varied.

References Cited by the Examiner

UNITED STATES PATENTS

| | | | |
|---|---|---|---|
| 2,576,836 | 11/51 | Hilsinger | 200—4 X |
| 2,973,667 | 3/61 | Williams | 200—11 X |
| 2,985,725 | 5/61 | DuVall | 200—11 X |
| 3,013,231 | 12/61 | Meadows et al. | 200—11 |

BERNARD A. GILHEANY, *Primary Examiner.*